INVENTORS
GEORGE A. ZINK
WALTER E. TAYLOR
BY
ATTORNEY

United States Patent Office 2,976,083
Patented Mar. 21, 1961

2,976,083

INTEGRALLY CAST VEHICLE WHEEL AND BRAKE DRUM WITH HEAT SINK

George A. Zink, Bedford, and Walter E. Taylor, Seymour, Ind., assignors to General Motors Corporation, Detroit, Mich., a corporation of Delaware Filed Oct. 12, 1959, Ser. No. 845,827

5 Claims. (Cl. 301—6)

This invention relates to a wheel adapted for use on a vehicle and further adapted to having a brake incorporated in the wheel. More specifically, the invention relates to an integrally cast vehicle wheel and brake drum that includes an arrangement for absorbing heat during a brake application and then providing for dissipation of the absorbed heat during periods when the brake is not in operation.

One of the recognized problems of vehicle brakes is the large amount of heat generated in a vehicle wheel during a brake application. In conventional drum type brakes the brake shoes create a high degree of friction on the brake drum so that the modern heavy high-powered vehicles require absorption of a large amount of brake horsepower in stopping the vehicles, the brake horsepower being given off as heat to the brake drum and wheel assembly.

When a brake application is made the temperature of the brake drum and the associated wheel rises rapidly, and to abnormal temperatures because of insufficient heat dissipating capacity of the brake drum and the wheel of the vehicle. Many arrangements have been provided to exteriorly fin the brake drum to increase the heat dissipating capacity but even this expedient has been insufficient.

Also, the high temperature rise of the wheel during heavy brake application results in transmission of a large amount of heat to the hub of the vehicle wheel resulting in the grease in the hub bearings being thinned by the temperature rise of the grease so that it tends to seep more readily through the grease seals provided at the spindle hubs.

An object of this invention is to provide a vehicle wheel and drum assembly with a chamber that contains a confined body of liquid that is in thermal engagement with the vehicle wheel and brake drum so that the confined body of liquid can absorb a large volume of the heat generated during a brake application and thereby result in a lower operating temperature of the brake drum and less transmission of heat to the wheel hub. The body of liquid is confined in a chamber in a manner that the chamber is exposed to the atmosphere, and particularly to the air stream passing over the outboard side of the vehicle wheel so that during periods when the brakes are not being used the heat absorbed by the confined body of liquid in the chamber can be dissipated to the atmosphere.

It is also an object of the invention to provide a unitary cast structure incorporating the features of the foregoing object with the structure forming the chamber confining the body of liquid arranged in a manner to avoid problems of centrifugal balance and yet provide for maximum dissipation of stored heat from the body of liquid to the surrounding atmosphere.

Still another object of the invention is to provide a vehicle wheel structure in accordance with the foregoing objects wherein the chamber containing the body of confined liquid for temporary heat storage is also provided with a pressure relief valve that will open to allow for expansion of liquid in the chamber upon a high temperature rise or vaporization thereof, the relief valve being so arranged as to reduce any problem of centrifugal unbalance in the wheel.

Further objects and advantages of the present invention will be apparent from the following description, reference being had to the accompanying drawings wherein preferred embodiments of the present invention are clearly shown.

Figures 1, 2:
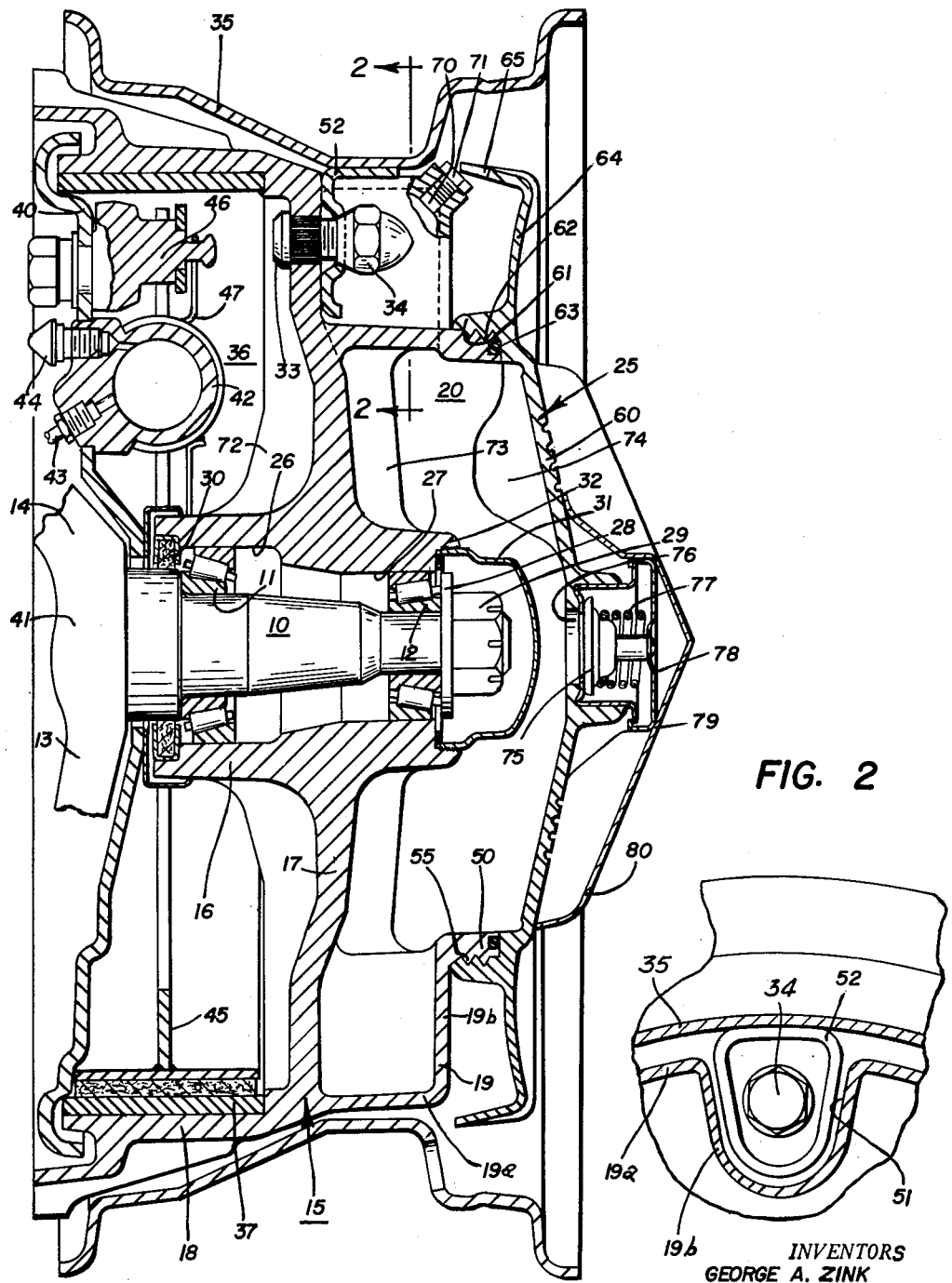
Fig. 1 is a vertical cross-sectional view of a wheel and brake assembly incorporating features of this invention.
Fig. 2 is a cross-sectional view of a portion of the structure taken along line 2—2 of Fig. 1 illustrating the arrangement for mounting a wheel rim on the wheel structure.

In this invention a vehicle axle spindle 10 is provided with antifriction bearings 11 and 12 for supporting the wheel structure 15 on the spindle. As shown in Fig. 1, the wheel is illustrated as being mounted on a front axle spindle of a vehicle, the arms 13 and 14 extending to lower and upper ball joint or spherical joint mounting means of any conventional variety (not shown).

The wheel structure 15 is a unitary casting consisting of a wheel hub portion 16, a generally radially positioned flange portion 17 extending from the hub portion and forming a wheel flange that terminates in an annular flange portion 18 forming a brake drum portion positioned at the inboard side of the wheel flange 17 (the inboard side being toward the center line of the vehicle) and a second generally annular flange portion 19 disposed on the outboard side of the wheel flange 17 and forming therewith a fluid containing compartment 20 that is closed by a closure member 25.

The hub portion 16 of the wheel structure 15 has an axially extending stepped bore consisting of the stepped portion 26 receiving the antifriction bearing between the recess portion 26 and the spindle 10 and a stepped portion 27 similarly receiving the antifriction bearing 12 between the hub 16 and the spindle 10. The wheel structure 15 is retained on the axle spindle 10 by means of the washer 28 and the nut 29 threaded on the outboard end of the spindle in conventional manner. The inboard end of the hub 16 supports a grease seal 30 between the hub and the spindle 10 to prevent loss of grease from within the hub. A cap 31 is threadedly received at the outboard end 32 of the hub 16 to enclose the retaining nut 29 and retain grease within the hub 16.

Cast integrally with the hub 16 is a generally radially extending wheel flange portion 17 that has a plurality of studs 33 mounted in the flange portion and forming the means on which the stud nuts 34 are threadedly received to retain a tire rim 35 mounted on the wheel flange 17.

The wheel flange 17 terminates at its outer periphery in a generally annular flange portion 18 that forms the brake drum for a friction brake disposed within the open ended chamber 36 provided by the annularly arranged brake drum flange 18. The brake drum flange 18 is preferably provided with a wear surface 37 suitably secured to the cast flange portion 18. Preferably the hub, the wheel flange and the brake drum heretofore described are cast of aluminum while the wear lining 37 is of iron or steel.

The brake drum 18 is structurally associated with a backing plate 40 mounted on the steering knuckle 41 that includes the arms 13 and 14. The backing plate 40 carries a hydraulic wheel cylinder 42 which may be of any conventional type that is supplied with hydraulic fluid under pressure from a master cylinder (not shown) of a hydraulic brake system through the inlet connection 43. A bleed port 44 is also provided in the wheel cylinder 42. Brake shoes 45 have one end suspended from the anchor pin 46 secured to the backing plate 40, the brake shoes being expanded into engagement with the brake drum 18 by action of the wheel cylinder 42 in conventional manner. Suitable retraction springs 47 are provided normally to retain the brake shoes in their retracted position when the brake pedal is released by the operator. Integrally cast with the wheel flange 17 is a generally annularly arranged flange portion 19 that is disposed on the outboard side of the wheel flange and encircles the outboard end of the wheel hub 16. This flange portion 19 consists of a generally annular wall 19a extending axially of the wheel hub 16 on the outboard side of the wheel flange 17 and a generally radial wall portion 19b extending inwardly toward the axis of the wheel structure. The wall portion 19b terminates in an annular cylindrical portion 50 that is positioned radially inwardly relative to the wall portion 19a and forms a circular open end for the chamber 20 formed by the wall portions 19a and 19b of the flange portion 19.

As is more particularly illustrated in Fig. 2, the wall portion 19a is formed in a manner to provide pocket recesses 51 that are spaced equidistantly around the wheel flange 17 to receive the mounting lug members 52 secured to the tire rim 35, the lug members 52 being secured to the wheel flange 17 by the lug nuts 34 threaded onto the wheel studs 33. From the illustration in Fig. 1 it will be apparent that the annular flange portion 50 is radially inwardly of the pocket recesses 51 and can therefore be made with a true cylindrical contour with exterior periphery thereof having the threads 55 suitably formed therein.

A closure member 25 is provided at the open end of the liquid receiving chamber 20 to confine a body of liquid therein. The closure member 25 has a generally radially disposed wall portion 60 provided with an annular flange portion 61 having internal threads 62 whereby the closure member 25 is threadedly received on the flange portion 50 on the wheel structure and the juncture between the two parts sealed by means of an O ring 63.

The closure member 25 also includes a generally radially extending flange portion 64 that extends radially beyond the cylindrical portion 50 of the wheel structure and terminates in a generally annular portion 65 that encloses the pocket recesses 51 from view from the outboard side of the vehicle wheel and also prevents access to the wheel nuts 34.

The chamber 20 formed by the generally annular flange portion 19 and the wheel flange 17 that is closed by the closure member 25 may be filled with a suitable fluid through a filler opening 70 closed by a nut 71. When the temperature is above freezing, water is a suitable fluid for filling chamber 20, whereas under conditions below freezing an antifreeze fluid may be mixed with the water in the chamber 20.

As shown in Fig. 1, a plurality of radially extending fins 72 are positioned on the inboard side of the wheel flange 17 within the chamber containing the brake structure whereby heat developed in the brake chamber and in the brake drum 15 can be transferred rapidly to the wheel flange 17. Similarly, the wheel flange 17 is provided with a plurality of radially disposed fins 73 on the outboard side of the wheel flange and within the chamber 20 to provide an extended surface area in thermal engagement with the liquid within the chamber 20 for rapid absorption of heat from the fins 72 in the brake chamber and the wheel flange 17. The cover plate 25 is also provided with a plurality of radially disposed fins 74 extending into the chamber 20 for rapid conduction of heat from the liquid confined in the chamber to the cover member 25 and thereby for dissipation to the atmosphere in the air stream passing over the outboard side of the wheel.

The cover member 25 supports a pressure relief valve 75 that closes an axial opening 76 in the member 25, the valve member being retained on its seat by means of a compression spring 77 enclosed within the valve cage 78 that is a part of a decorative cover member 79. The cover member 79 has a plurality of generally radially extending arms 80 adjacent the outboard face of the cover member 25, these arms 80 providing heat dissipation surface for heat radiating from the cover member 25 and for effecting air turbulence adjacent the outboard side of the cover member 25 to provide for more effective heat dissipation from the cover member and therefore more rapid removal of heat from the liquid in the chamber 20.

The pressure relief valve 75 is provided to relieve pressure above a predetermined value from within the liquid chamber 20 either upon expansion of the liquid or vaporization thereof.

From the foregoing description it will be apparent that heat generated in the brake drum portion 18 of the wheel structure 15 during a brake application will be rapidly transferred to the body of liquid confined in the chamber 20 so that the liquid in the chamber acts as a heat sink for storage of a large volume of heat for a temporary period, the rapid flow of heat into the heat sink reducing the overall rise of temperature of the brake drum and of the wheel structure. Whenever the brake is released and heat is no longer being generated, the liquid will transfer heat to the cover member 25 as well as to the wheel structure itself for rapid dissipation of the stored heat.

Obviously, the arrangement is such that the overall temperature of the hub 16 will be maintained at a lower average temperature so that the problem of thinning of grease within the hub is therefore relieved.

Also, since all of the wheel structure is disposed about its common axis, it will be apparent that the body of fluid contained in the chamber 20 and the weight of the relief valve 75 will be no problem insofar as centrifugal balance of the wheel is concerned.

While the embodiments of the present invention as herein disclosed constitute a preferred form, it is to be understood that other forms might be adopted.

What is claimed is as follows:

1. A vehicle wheel and brake drum structure for containing a confined body of liquid for temporary heat storage and subsequent dissipation, comprising; a unitary casting structure including a generally cylindrical body portion positioned concentrically of the axis of the casting structure and forming a wheel hub arranged to receive an end of a vehicle axle, a generally radially extending flange portion extending from said hub and forming the wheel flange of the structure, said wheel flange portion terminating in a first annular flange portion concentric with the axis of the structure disposed on the inboard side of the said wheel flange portion and forming a brake drum, and a second generally annular flange portion concentric with the axis of the structure disposed on the outboard side of said wheel flange portion of substantially the same diameter as said first flange portion and forming with the wheel flange portion an open-ended chamber in which the outboard end of the said hub is positioned, said second flange portion having pocket recesses extending inwardly from the periphery of the second flange portion open to the outboard side of the wheel flange to receive wheel mounting lug members therein for mounting of a tire rim on the said wheel flange; and a closure member secured on said second flange portion closing the open end of the said chamber to confine therein a body of liquid in the said chamber in thermal association with the chamber walls for thermal exchange of heat from the said structure to the atmosphere surrounding the said chamber.

2. A vehicle wheel and brake drum structure for containing a confined body of liquid for temporary heat storage and subsequent dissipation, comprising; a unitary casting structure including a generally cylindrical body portion positioned concentrically of the axis of the casting structure and forming a wheel hub arranged to receive an end of a vehicle axle, a generally radially extending flange portion extending from said hub and forming the wheel flange of the structure, said wheel flange portion terminating in a first annular flange portion concentric with the axis of the structure disposed on the inboard side of the said wheel flange portion and forming a brake drum, and a second generally annular flange portion concentric with the axis of the structure disposed on the outboard side of said wheel flange portion and forming with the wheel flange portion an open-ended chamber in which the outboard end of the said hub is positioned, said second flange portion having pocket recesses extending inwardly from the periphery of the second flange portion open to the outboard side of the wheel flange to receive wheel mounting lug members therein for mounting of a tire rim on the said wheel flange, said second flange portion also including a cylindrical portion concentric with the axis of the structure disposed radially inwardly of said pocket recesses and extending axially beyond the said pocket recesses and forming the said open end of said chamber, and a closure member secured on said cylindrical portion of said second flange portion closing the said open end of the said chamber to confine therein a body of liquid in the said chamber in thermal association with the chamber walls for thermal exchange of heat from the said structure to the atmosphere surrounding the said chamber.

3. A vehicle wheel and brake drum structure constructed and arranged in accordance with the structure set forth in claim 2 wherein the said closure member has a generally radially extending flange portion extending radially outwardly relative to the said cylindrical portion on the said second flange portion and extending outwardly to an extent substantially enclosing the said pocket recesses to prevent access to the wheel mounting lug members when the said closure member is in position on the said second flange portion.

4. A vehicle wheel and brake drum structure constructed and arranged in accordance with the structure set forth in claim 2 that includes a pressure relief valve means carried on the said closure member on the axis of the said structure for centrifugal balance and to provide for relief of pressure internally of the said chamber on expansion or vaporization of the fluid therein.

5. A vehicle wheel and brake drum structure as set forth in accordance with claim 2 wherein the said pressure relief valve means includes generally radially extending sheet metal portions providing radiating surface for dissipation of heat from the said chamber.

References Cited in the file of this patent

UNITED STATES PATENTS

| | | |
|---|---|---|
| 2,404,308 | Magdus | July 16, 1946 |
| 2,834,636 | Fawick | May 13, 1958 |
| 2,842,377 | Ronning | July 8, 1958 |